United States Patent Office 2,856,543
Patented Oct. 14, 1958

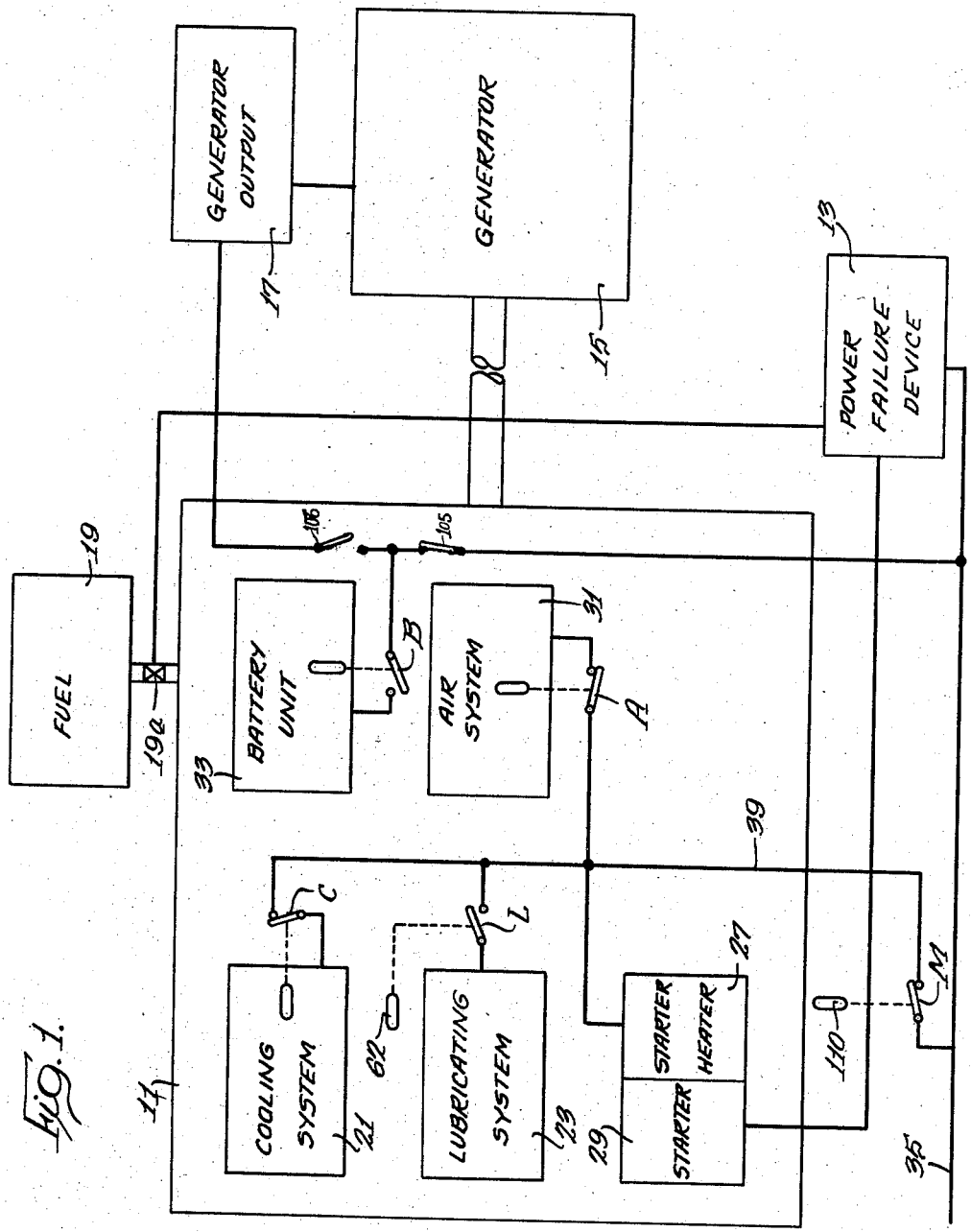

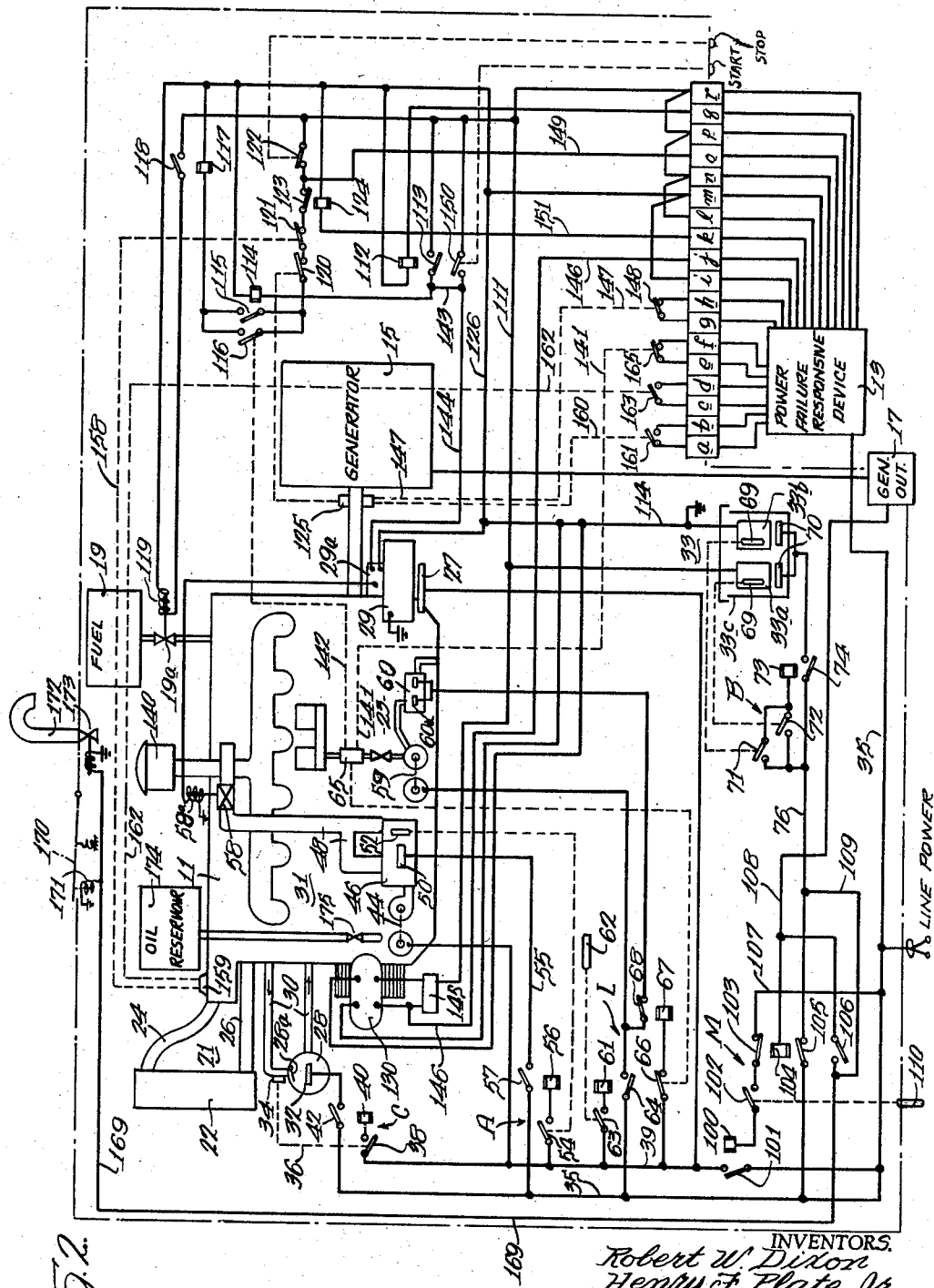

2,856,543

MEANS FOR MAINTAINING STANDBY POWER SOURCE IN IMMEDIATE READINESS

Robert W. Dixon, Joliet, and Henry F. Plate, Jr., Park Forest, Ill., assignors to H. K. Porter Company (Delaware), a corporation of Delaware Application December 19, 1956, Serial No. 629,423

6 Claims. (Cl. 290—30)

This invention relates generally to unattended standby power generating equipment, and more particularly to a system for automatically maintaining such equipment in condition for instantaneous operation and for automatically activating such equipment upon occurrence of a power failure.

Standby power generating stations are often located in remote areas and it is frequently desirable to leave such stations unattended for periods of time. One common geographical location for such units is in the Arctic regions where it is necessary to maintain a constantly available source of power for operation of various military and scientific outposts.

One of the greatest obstacles to operation of any machine in the Arctic climate is the difficulty of maintaining the unit sufficiently warm as to be operable. It is the object of the present invention to provide improved means for automatically maintaining the equipment, even in unattended stations, at such temperatures as will place the equipment in a ready condition.

Since an unattended standby power generating unit is connected to a primary source of electrical power, this invention is intended to be operated from the primary power source. Further, in accordance with the invention, if the primary source is interrupted, the equipment is automatically activated and operated until the primary source is restored.

It is an object of this invention to provide a thermostatically controlled system for maintaining standby power generating equipment in condition for instantaneous operation.

It is another object of this invention to provide means responsive to an interruption of the normal flow of current in a power line for supplying auxiliary current to the line.

Another object of this invention is to provide an automatic system for starting an engine generator set in response to a power failure.

It is a further object of this invention to provide a system operable upon occurrence of ambient temperatures below a predetermined minimum for maintaining the critical components of the equipment at operating temperatures according to their individual requirements, so as to conserve heat energy and to supply heat only when required, and for as long as is required to maintain the unit in operable condition.

These and other objects of our invention will be apparent to those skilled in the art from the following description, when read in conjunction with the drawings wherein:

Fig. 1 is a block diagram of a standby power unit showing the improved system of our invention associated therewith; and Fig. 2 is a circuit diagram of the system.

In the remote regions which are most suited for the use of unattended standby power generating equipment, the problem of logistics is such that transportation of heating fuel and equipment tends to dimish the advantages of an unattended station. It has been the practice in the past to maintain Arctic equipment in standby condition by means of petroleum heaters of one sort or another. Our invention utilizes the electric power lines that the unit is intended to service for its source of heat energy. When the power transmission through the line is normal, the standby engine generator set is not in operation, and a portion of the energy from the power line is utilized to heat the components of the engine and to hold the engine actuating circuits open. If there is a power failure, the actuating circuits of the standby unit close and the engine of the unit is automatically started. With the engine running, there is no necessity for heating the same until the power is once more restored. Upon restoration of full power the operating circuits of the engine are opened to stop the engine and energy is again supplied to the means for maintaining the engine in a condition of readiness.

The portions of an engine which must be protected against failure due to excessive cold are the cooling system, the lubricating system, the starter, the battery, and the air intake system. These components of the engine generator do not all have the same minimum requirements of warmth for most efficient initial operation. Our invention, therefore, utilizes individual electric heaters for all of the separate component parts which are in turn controlled by a heat sensing means such as a thermostat. In this manner, each component is maintained at or above its minimum heat requirement without the undue dissipation of energy which would result in maintaining the entire unit at a satisfactory temperature.

Referring now to the block diagram of Figure 1, the engine generator unit is depicted as an engine 11 connected to a generator 15. A power line 35 is shown connected to a power failure responsive device 13. The power failure responsive device 13 is electrically connected to the engine starter 29 and to the control valve 19a of the fuel supply 19, to effectuate starting of the engine upon failure of the power in the line 35. A main control circuit 39 receives its operating current from the power line 35. A control means M for the circuit 39 is controlled at least in part by a thermostatic means 110 which is located outside of the enclosure for the engine generator set and is adapted to close the control means M when the ambient temperature outside of the engine housing is less than a predetermined minimum, for example, 50° F. With the control M closed, current is supplied directly to the starter heater unit 27, and is adapted to be supplied to heater means associated with each of the cooling system 21, the lubricating system 23 and the air system 31, under the control of individual thermostatic control means C, L and A, respectively. When the control M is closed, heat is supplied to the lubricating system 23 at such times as the temperature within the engine enclosure or housing descends to a predetermined degree, for example, 10° F., as sensed by a thermostatic means 62 associated with the control L.

The heating means for the cooling system 21, subject to the control means M, is operated in response to the temperature of the coolant under control of the means C, and normally maintains the coolant at a predetermined temperature, for example, 160° F.

The air system 31 is controlled in a similar manner by means M and A, normally to maintain a supply of air at a predetermined temperature higher than 50° F. when the outside ambient temperature is below 50° F. in the example given. This supply of air, which as a precautionary measure should not be heated to more than about 450° F., is also employed to preheat the engine block.

Because the battery unit of the engine does not receive heat from the operating engine and should be relatively warm if it is to function properly and take a charge, it is adapted to have its heater unit energized from either the power line 35 or the generator output 17. To this end, control means including a pair of switches 105 and 106, which may suitably be part of the control means M, are provided for selectively connecting the battery heater either to the line 35 or, in the event of failure of the power source 35, to the generator output unit 17. When the temperature within the battery unit descends to a predetermined degree, for example, 32° F., a thermostatic control means B is closed, thereby to supply current to the battery heater normally to maintain the battery unit at or somewhat above the control temperature.

Thus, it is to be appreciated that the essential or critical components of the engine of the generator set are constantly maintained at operating temperatures, and more particularly at temperatures facilitating instantaneous starting of the engine, so that the standby power source can be brought up to full output current and accept full line load in an exceedingly short period of time, for example, 20 seconds, irrespective of ambient weather conditions. Moreover, the system includes power failure responsive means for instantly starting the engine upon occurrence of a power failure or a critical decrease in line power, so that continuous supply of power is assured regardless of existing conditions and without necessity for continuous attendance of personnel at the standby unit.

Having described the general circuit and its effect upon the various components of the engine generator set, the specific details of the control system of the invention will now be described with reference to Figure 2.

Figure 2 is a wiring diagram representative of our winterization and automatic starting system. The engine generator set with which the system is associated is shown as including an internal combustion engine 11, suitably a diesel engine, and a generator 15, the engine and generator being enclosed within a sheet metal or like housing represented by the dot-dash outline. The normal power source for the system is line power supplied to the line 35. In the event of failure of this source, as sensed by the device 13 which is connected to the line 35, the engine generator set is put into operation to supply power at the output terminal block 17 which is accessible from the exterior of the engine enclosure and normally connected to the appliances served by line power. To insure a continuous supply of power to such appliances, it is the object of the present invention to afford a system maintaining the engine generator set in a condition of immediate readiness for operation. To this end, the system includes means for winterizing the engine of the generator set and for automatically starting and operating the set upon occurrence of a power failure or predetermined decrease in electrical power of the primary power source.

Considering first the winterizing means, it is to be appreciated from the foregoing that such means comprises heaters for maintaining the cooling system, lubricating system, air system and battery unit of the engine at optimum operating temperatures.

The cooling system for the engine 11 is indicated generally at 21 and is comprised of a reservoir 22, coolant transfer pipes 24 and 26 from the reservoir to the block of the engine 11, and a heating chamber 28 connected to the cooling system of the engine 11 by circulating tubes 30. A heating means, indicated in Figure 2 as an immersion type heating element 32, is located in the chamber 28 of the cooling system. A thermostat 34 is located at the inlet tube to the chamber 28 to control the power to the heater. A control means, indicated by the dotted line 36, connects the thermostat 34 to a switch 38 in the conductor 39. As previously explained, the conductor 39 is connected to the line 35 through the control means M which will be described in detail hereinafter. The switch 38 thus controls the supply of current to a relay 40 which in turn controls power to the heater 32 through its make contact 42 from the power line conductor 35. The thermostat 34 is preferably set to open above 160° F. normally to maintain the coolant at that temperature. A check valve 28a is preferably associated with the inlet to the chamber 28 to accommodate one-way circulation of water through the cooling system due to the flow induced by the heater.

The air intake system is indicated generally at 31 and is comprised of an electric blower unit 44 connected to the conductor 39, a heater box 46 with which the blower communicates and outlet piping 48 from the box. An air heating element 50 which may be of any suitable type, such as a fin type heater, is located within the heater box 46. A thermostatic control 52 is also located in the heater box 46 and has a control line running therefrom to a switch 54. When the temperature in the heater box 46 is below the predetermined maximum for which the thermostatic control 52 is set (something above 50° F. and below 450° F.), the control 52 closes the switch 54 thereby to energize a relay 56 from the conductor 39. Energization of the coil of the relay 56 closes its make contacts 57 which are connected in the conductor 55 to supply operating current from line 35 to the heating element 50 in the heater box 46.

The blower 44 is operated to blow air from the interior of the engine enclosure into the heater box 46 and from thence through the piping 48 into the crankcase of the engine at a point above normal oil level, the heated air passing through the block and around the pushrods to heat the engine per se. The air discharges from breather ports in the upper regions of the engine back into the engine enclosure to heat the air within the enclosure and generally maintain a temperature therein above outside ambient temperature. The heater 50 and thermostat 52 operate essentially to maintain the engine at a temperature facilitating immediate starting, but of course also serve to heat the air within the engine enclosure.

The outlet pipes 48 from the heater box 46 also lead to the intake manifold of the engine, but are normally closed off at this point by a solenoid operated valve 58. Upon occurrence of a power failure, the blower 44 is stopped due to deenergization of the line 35 and the engine starting cycle is initiated by means of the power failure responsive device 13. When the starting cycle is initiated, the solenoid coil 58a of the valve 58 is energized to open the valve and accommodate supply of heated air from the box 46 to the intake manifold and cylinders of the engine by virtue of the suction force created in the cylinders upon cranking of the engine. Both fresh and heated air are supplied to the engine from the pipe 48 and the engine air cleaner 140, thus to provide warm intake air insuring instantaneous starting. When the engine starts and the cranking or starting cycle is completed, the solenoid 58a is deenergized whereupon the valve 58 is closed and the air heating system becomes inoperative until the primary source of power is restored.

The lubricating system 23 is comprised of an electric motor driven auxiliary pump 59 for circulating oil through the engine 11 when the engine is not in operation, an oil heating pan or container 60, and a pair of heating units 60a in the pan. Operation of the auxiliary pump 59 is controlled by the relay 61, which in turn is controlled by a switch 63 operated by the thermostat 62. The thermostat 62 senses the ambient temperature within the engine housing and is adapted to close at a specified temperature, preferably about 10 degrees F. Operation of relay 61 causes its make contact 64 to be closed, thereby supplying energy from the power line 35 to the motor of the pump 59. The heating elements 60a of the oil heater 60 are dually controlled by the ambient temperature, as sensed by the thermostat 62, and by the oil pressure as determined by an oil pressure responsive means 65. The pressure responsive means 65, which may be a switch or gauge, is operatively connected to a normally closed switch 66 and is adapted to open the switch 66 when the pressure in the oil system is below a pre-determined level, suitably about 15 p. s. i. With the contact 66 closed, a relay 67 is energized from the conductor 39 so as to hold the make contact 68 thereof closed, thereby providing a path for current flow from the power line 35 to the heating elements 60a. Thus, the elements 60a heat the oil only when it is being circulated by the pump 59. The elements 60a have a limited capacity, preferably less than 20 watts per square inch, to avoid carbonizing the oil.

The pressure responsive means 65 also includes control connections 141 and 142 to the engine starting and operating circuit for purposes to be described.

The starter motor 29 of the engine has associated therewith a heating element 27 which is connected directly to the conductor 39. This heater is controlled solely by the means M and thermostat 110, so that the same is energized continuously when the ambient temperature outside of the engine housing is below a predetermined temperature of the order of 50° F.

The battery unit 33 for supplying starting current comprises a pair of conventional batteries 33a and 33b, housed in an insulated housing 33c. Each battery has a heating unit 70 associated therewith, and thermostatic control means 69 are provided for sensing either the temperature in the housing 33c or the temperature of the electrolyte in each battery, the latter arrangement being shown in Figure 2. The thermostats 69 respectively control a pair of switches 71 and 72 which are connected in parallel and each control energization of a relay 73. When the electrolyte in either of the batteries reaches a predetermined minimum temperature, preferably about 32° F., the thermostatic means closes one of the switches 71 and 72 to supply current from the power line 35 through a conductor 76 and a normally closed contact pair 105 of the relay 104 to the relay 73. Upon operation of the relay 73, its make contact 74 is closed, thereby supplying current from the power line 35 along the said path to the heating elements 70 within the battery box 33.

The entire winterization system described above is intended to be placed into operation when the temperature outside of the engine enclosure reaches a predetermined minimum, preferably about 50° F. Control of this function is attained by the means M which includes the thermostat 110 exposed to the exterior of the engine enclosure. The thermostat 110 includes a control connection to a switch 102. When the switch 102 is closed, current from the power line 35 is supplied through the conductor 107, the normally closed contact pair 103 of the relay 104, and the switch 102 to the relay 100. Energization of the relay 100 causes its make contact 101 to close, thereby connecting the conductor 39 to the power line 35. Unless the contact 101 is closed, the winterization system, with the exception of the battery heater means 33, cannot be energized. The system is thus controlled primarily by the thermostat 110.

A conductor 108 is connected to the generator output 17 and serves as a source of power when the primary source fails and the engine generating set is running. When the engine generating set is running, the relay 104 is energized to open the contact pairs 103 and 105, and to close the contact pair 106. Opening of the contact pair 103 disconnects the relay 100 and thus insures that the conductor 39 will not be energized from generator output. Opening of the contact pair 105 insures that the line 35 likewise will not be energized from generator output. The reason for disconnecting the winterization system with the exception of the battery heaters, is that they are not required while the engine is in operation. It is, however, desirable to energize the battery heating elements from the generator output for the reasons previously described. To this end, the make contact pair 106 of the relay 104 is closed when the engine is operating to complete a circuit from the generator output terminal 17 through the line 108, the contact pair 106, the conductor 109, and the conductor 76 to the battery unit, the unit remaining under the thermostatic control of the means B.

Upon occurrence of a power failure in the line 35, the device 13 operates to perform certain functions. To facilitate correlation of these functions, a terminal board has been shown operatively associated with the device 13, the terminals thereof being referred to hereinafter as 13a to 13r.

When the primary current in the line 35 is interrupted, the power failure responsive device 13 closes a circuit through terminals 13q and 13r from the batteries 33a and 33b through a start relay 112. Operation of the start relay 112 causes its make contact 113 to close to complete a circuit to the coil of a relay 114, thereby closing the make contact 115 thereof. Closing of the contact 115 completes an operating circuit for a relay 117 to close its make contact 118, thereby closing a circuit from the battery unit 33 to the solenoid 119 of fuel control valve 19a. Fuel is thereupon supplied to the engine from the reservoir or tank 19.

Upon energization of the start relay 112 and closing of the contact 113 thereof, current is also supplied through conductors 143 and 144 from the battery unit 33 to the solenoid 29a of the starter motor 29. Energization of the solenoid 29a results in moving the starter pinion into engagement with the engine flywheel, in energization of the starter motor to crank the engine, and in energization of the solenoid 58a of valve 58 to open the intake manifold of the engine to heated air from the air heater 31.

When the engine starts and comes up to speed, the battery charging generator, indicated at 130, commences to generate current which is supplied through a regulator 145 and a conductor 111 to the battery unit 33 to charge the batteries. A conductor 146 also leads from the generator output terminals to the terminal 13j associated with the device 13. Simultaneously, a centrifugal speed sensing device 125 on the engine shaft actuates to open position, through a control instrumentality 147, a switch 148 which normally closes a circuit through terminals 13g and 13h. The signals supplied to the device 13 through the terminals 13g, 13h, and 13j, indicate that the engine is started and running and energize the device 13 to disconnect the circuit through terminals 13q and 13r, thereby to de-energize the relay 112, starter solenoid, starter motor and solenoid 58a, and terminate cranking. De-energization of solenoid 58a results in closing the valve 58 so that air for combustion is not drawn from the engine crankcase during operation of the engine. Thereafter, during normal operation of the engine, a circuit is maintained through the terminals 13o and 13p and a conductor 149 to maintain the fuel valve 19a open. When the relay 112 is de-energized, the relay 114 is also de-energized, but at this time a switch 116 connected in parallel with the control means 115 of the relay 114 is normally closed to maintain operation of the engine. The switch 116 is controlled by the oil pressure responsive device 65 through the control 142 and is normally closed when the oil in the engine is at normal operating pressure.

An alternative manner of starting the engine is afforded by a manual push button mounted on the engine enclosure and including a control extending to a switch 150 which is connected in parallel with the contact means 113 of the relay 112. Upon closing of this switch starting of the engine is initiated in substantially the same manner as previously described.

When a power failure in line 35 occurs and the contact pair 106 of relay 104 is closed, power is also supplied from the generator output 17 through a conductor 169 to a pair of solenoid operated units 171 and 173. The solenoid 171 is associated with one or more vent flaps 170 on the engine enclosure and is adapted to open the same to vent the enclosure and the engine during operation of the engine. The solenoid unit 173 comprises a valve associated with a fresh air intake pipe 172 which is located adjacent the engine air cleaner 140, the valve 173 being opened upon energization to afford a supply of fresh air to the engine during operation thereof.

For control purposes during operation of the engine, means are preferably provided for indicating or signalling low oil presusre, excessive coolant temperature and over speed. These means comprise the control line 141 leading from the oil pressure responsive device 65 to a normally closed switch 165 associated with the terminals 13e and 13f, a control line 162 leading from thermostatic means 159 in the engine cooling system to a normally open switch 163 associated with the terminals 13c and 13d, and a control line 160 leading from the centrifugal speed responsive device 125 to a normally open switch 161 associated with the terminals 13a and 13b. The signals affected by these control instrumentalities may suitably be transmitted to a central, attended maintenance depot, so that the engine generator set may be serviced promptly in the event it is malfunctioning.

For direct control of the engine, similar controls are provided. Specifically, the switch 116 as controlled by the instrumentality 142 from the oil pressure responsive device 65 is operable to open the circuit to the solenoid of the fuel supply valve 19a when oil pressure is below normal. To mitigate against low oil pressure consequent upon low oil level, an oil reservoir 174, preferably of about 5 gallons' capacity, is provided on the engine, the reservoir including a valve 175 responsive to oil level in the engine crankcase for automatically replenishing oil lost due to leakage.

Included in the same circuit as the switch 116 and the relay control 115 are the three normally closed switches 120, 121, and 122, and the normally closed contact pair 123 of the relay 124. Opening of any one of these switches or contact means will result in de-energization of the solenoid 119 and closing of the fuel supply valve 19a. The switch 120 is controlled by the centrifugal speed responsive means 125 and is adapted to be opened upon occurrence of excessive engine speed to stop the engine by stopping the flow of fuel. The switch 121 is controlled through the instrumentality 158 from the thermostatic means 159 in the engine cooling system and is adapted to be opened when the temperature in the cooling system exceeds a predetermined limit, thus to stop the engine. The relay 124 comprises an automatic stop means and is controlled by the device 13 through the terminals 13k and 13l. When line power is restored after a period of failure, the device 13 completes a circuit through the terminals 13k and 13l to energize the relay 124 from the battery unit 33 via conductors 126 and 111 and inter-connection of the terminal 13l with the terminal 13r. Operation of the relay 124 opens the break contact 123 thereof, thereby interrupting the operating circuit for the fuel solenoid 119 and stopping operation of the motor. The normally closed switch 123 is adapted to be opened by manual operation of a stop button projecting to the exterior of the engine enclosure. Thus, the engine may be controlled or stopped by virtue of low oil pressure, high coolant temperature, excessive speed, or restoration of the primary power source, and may also be stopped manually.

The terminals 13m and 13n are provided for the purpose of charging the battery without removing it from the battery housing 33 by supplying charging current through the terminals 13n and 13r to the conductor 111 and through the terminal 13m to the conductor 126, hence to both sides of the battery unit 33.

If power is restored in the line 35, the engine is stopped in the manner above described, and the control means M of the winterization apparatus is restored to its original condition to again maintain the unit in a condition of immediate readiness.

From the foregoing, it is to be appreciated that the present invention provides a system for maintaining an internal combustion engine in immediate readiness for instantaneous operation when necessary and for automatically starting the engine when it is needed, the system including the necessary safeguards to prevent malfunctioning of the apparatus and to conserve energy. As pointed out hereinbefore, the particular objective of the system is to maintain an engine generator set in a stand-by status so that it will start, stabilize and accept full load within 20 seconds automatically upon occurrence of a power failure in the primary source, irrespective of ambient weather conditions. This and the other objects of the invention have been shown herein to be attained in a practical, convenient and economical manner.

While we have described and shown what we regard to be the preferred embodiment of our invention, it is to be appreciated that various rearrangements, modifications, and changes may be made therein without departing from the scope of the invention, as defined by the appended claims.

We claim:
1. An auxiliary power unit for supplying emergency power to a transmission line upon failure of the primary source comprising an electric generator, an engine for operating said generator, electric heating means for maintaining said engine at a temperature for instant operation, a first circuit means operable to supply operating current to said heating means, a thermostatic control activated by the descent of the ambient temperature to a predetermined point for actuating said first circuit means, and a second circuit means held unoperated by the presence of current in said transmission line for activating said engine.

2. An auxiliary power unit for supplying emergency power to a transmission line upon the failure of the primary source comprising an electric generator, an engine for operating said generator, electric heating means for maintaining said engine at a temperature conducive to instant operation, a first circuit means operable to supply operating current from said transmission line to said heating means, a thermostatic control activated by the descent of the ambient temperature to a predetermined point for actuating said first circuit means, and a second circuit means held unoperated by the presence of current in said transmission line for operating said engine.

3. Standby controls for maintaining the lubricating system of an internal combustion engine in a state of readiness for instant operation comprising an electric heater positioned in said lubricating system, a heater circuit operable to energize said heater, a first thermostatic means positioned outside the housing of the engine, circuit means controlled by said first thermostatic means for conditioning said heater circuit for operation in response to an outside temperature below a predetermined minimum, a second thermostatic means positioned within the housing of said engine, a relay means controlled by said second thermostatic means for actuating said heating circuit at a second predetermined temperature within said housing, and an oil pressure measuring means including a normally closed switch in said heater circuit for interrupting said heater circuit in response to an oil pressure below a predetermined point.

4. In the combination of a primary electric power source and a standby engine-generator set wherein the set includes an internal combustion engine having cooling and lubricating systems, a battery and a starter, the improvement comprising electric heating means for each of the engine cooling and lubricating systems, battery and starter, an electric air blower having an outlet communicating with the interior of the engine, electric heating means associated with said blower for heating the air circulated thereby, each of said heating means and blower being electrically connected to the primary power source, a thermostatic control between said source and said heating means for effecting electrical connection between said source and said heating means at ambient temperatures below a predetermined minimum and for effecting disconnection of the same at temperatures above said minimum, means responsive to a power failure in said primary source for electrically connecting the engine battery and starter, means responsive to operation of the engine for disconnecting the battery and starter, and means responsive to restoration of power in said primary source for stopping the engine.

5. In the combination of a primary electric power source and a standby engine-generator set wherein the set includes an internal combustion engine having cooling and lubricating systems, a fuel supply, a solenoid valve controlling communication between the fuel supply and the engine, a battery and a starter, the improvement comprising electric heating means for each of the engine cooling and lubricating systems, battery and starter, an electric air blower having an outlet communicating with the interior of the engine, electric heating means associated with said blower for heating the air circulated thereby, each of said heating means and blower being electrically connected to the primary power source, a thermostatic control between said source and said heating means for effecting electrical connection between said source and said heating means at ambient temperatures below a predetermined minimum and for effecting disconnection of the same at temperatures above said minimum, secondary control means associated with each of the heating means for the cooling and lubricating systems, the air blower and battery for effecting, subject to said thermostatic control, electrical connection of the respective heating means to said primary source upon the occurrence respectively of predetermined conditions, means responsive to a power failure in said primary source for electrically connecting the engine battery to the starter and the solenoid valve, means responsive to operation of the engine for disconnecting the battery and starter, switch means responsive to each of excessive engine speed, excessive coolant temperature and low lubricant pressure for disconnecting said solenoid valve from the battery, and switch means responsive to restoration of power in said primary source for disconnecting said solenoid valve from the battery.

6. In the combination claimed in claim 5, the improvement comprising means responsive to a power failure in said primary source for electrically connecting the electrical output from said set to the heating means for the engine battery.

References Cited in the file of this patent

UNITED STATES PATENTS

| | | |
|---|---|---|
| 1,246,727 | Donning | Nov. 13, 1917 |
| 1,662,336 | Cosgray | Mar. 13, 1928 |
| 1,754,080 | Briggs et al. | Apr. 8, 1930 |
| 1,965,371 | Drabelle | July 3, 1934 |
| 1,992,568 | Connor | Feb. 26, 1935 |
| 2,063,994 | Frank et al. | Dec. 15, 1936 |
| 2,122,585 | Pollack et al. | July 5, 1938 |
| 2,142,210 | Rippingille | Jan. 3, 1939 |
| 2,255,743 | Jervis | Sept. 9, 1941 |
| 2,418,792 | Riggs | Apr. 8, 1947 |
| 2,442,380 | Schrodt et al. | June 1, 1948 |
| 2,451,976 | Reagan et al. | Oct. 19, 1948 |
| 2,516,048 | Endress | July 18, 1950 |
| 2,606,298 | Merritt | Aug. 5, 1952 |
| 2,691,110 | Lincoln | Oct. 5, 1954 |
| 2,698,391 | Braden et al. | Dec. 28, 1954 |
| 2,710,926 | Charles | June 14, 1955 |